(12) United States Patent
Milvaney et al.

(10) Patent No.: US 10,185,777 B2
(45) Date of Patent: Jan. 22, 2019

(54) MERGED AND ACTIONABLE HISTORY FEED

(71) Applicant: Microsoft Technology Licensing, LLC, Redmond, WA (US)

(72) Inventors: Douglas Lane Milvaney, Cambridge, MA (US); Maura FitzGerald, Swampscott, MA (US); Joshua Jones, Winchester, MA (US); Matt McNeill, Cambridge, MA (US); Manoj Sharma, Winchester, MA (US); Lidiane Jones, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 14/997,219

(22) Filed: Jan. 15, 2016

(65) Prior Publication Data

US 2016/0292289 A1 Oct. 6, 2016

Related U.S. Application Data

(60) Provisional application No. 62/141,639, filed on Apr. 1, 2015.

(51) Int. Cl.
*G06F 17/30* (2006.01)
*G06F 3/0484* (2013.01)
*G06F 17/22* (2006.01)
*G06Q 10/10* (2012.01)

(52) U.S. Cl.
CPC ...... *G06F 17/30876* (2013.01); *G06F 3/0484* (2013.01); *G06F 17/2288* (2013.01); *G06F 17/30106* (2013.01); *G06F 17/30112* (2013.01); *G06Q 10/101* (2013.01)

(58) Field of Classification Search
None
See application file for complete search history.

(56) References Cited

U.S. PATENT DOCUMENTS

| 6,507,845 | B1 | 1/2003 | Cohen et al. |
| 7,899,883 | B2 | 3/2011 | Rasmussen et al. |
| 7,974,948 | B2 | 7/2011 | Baer et al. |
| 8,453,052 | B1 | 5/2013 | Newman et al. |

(Continued)

OTHER PUBLICATIONS

"See the History of Changes made to a File", Published on: Mar. 16, 2015, Available at: https://support.google.com/docs/answer/190843?hl=en.

(Continued)

*Primary Examiner* — Hung D Le

(57) ABSTRACT

Aspects of the present disclosure relate to systems and methods for merging versions and activities associated with a file into a history feed and displaying the history feed on a user interface of a client computing device. In one aspect, a file is identified and activities associated with the file are also identified. It may be determined whether the file has at least one activity. When it is determined that the file has at least one activity, at least one actionable history element for the at least one activity is generated. Additionally, the generated history elements are merged to generate a history feed. The history feed is displayed on a user interface. The history feed may be displayed with an application that has opened the file.

20 Claims, 10 Drawing Sheets

(56) References Cited

U.S. PATENT DOCUMENTS

| | | | |
|---|---|---|---|
| 8,533,594 B2 | 9/2013 | Grossman et al. | |
| 8,739,021 B2 | 5/2014 | Yuniardi | |
| 8,832,099 B2* | 9/2014 | Howes | G06F 17/30011 |
| | | | 705/14.1 |
| 2006/0026502 A1 | 2/2006 | Dutta | |
| 2006/0136821 A1 | 6/2006 | Barabe et al. | |
| 2007/0088832 A1* | 4/2007 | Tsang | G06Q 10/00 |
| | | | 709/227 |
| 2008/0059539 A1 | 3/2008 | Chin et al. | |
| 2008/0140674 A1* | 6/2008 | Ishikawa | G06F 17/30867 |
| 2009/0006371 A1* | 1/2009 | Denoue | G06F 17/30867 |
| 2009/0222735 A1* | 9/2009 | Clark | G06F 17/30876 |
| | | | 715/738 |
| 2010/0299325 A1* | 11/2010 | Tzvi | G06F 17/2247 |
| | | | 707/728 |
| 2011/0225197 A1* | 9/2011 | Howes | G06F 17/30011 |
| | | | 707/780 |
| 2011/0252301 A1 | 10/2011 | Vollmer et al. | |
| 2012/0117457 A1 | 5/2012 | Yuniardi | |
| 2012/0233137 A1 | 9/2012 | Jakobson et al. | |
| 2013/0054517 A1* | 2/2013 | Beechuk | G06F 17/30867 |
| | | | 707/609 |
| 2013/0151301 A1 | 6/2013 | Robb | |
| 2013/0185252 A1 | 7/2013 | Palmucci | |
| 2013/0246901 A1 | 9/2013 | Massand | |
| 2013/0262420 A1 | 10/2013 | Edelstein et al. | |
| 2014/0032488 A1 | 1/2014 | McAfee et al. | |
| 2014/0032489 A1 | 1/2014 | Hebbar et al. | |
| 2014/0032502 A1 | 1/2014 | Kraley | |
| 2014/0033068 A1 | 1/2014 | Gupta et al. | |
| 2014/0244576 A1* | 8/2014 | Masuda | G06F 17/30761 |
| | | | 707/609 |

OTHER PUBLICATIONS

Curry, Ben, "Microsoft SharePoint 2010 Administrator's Pocket Consultant", Microsoft Press, Jul. 4, 2010, 250 Pages.

McKenna, et al., "SharePoint 2010 All-In-One for Dummies—1st Edition", Wiley Publishers, Nov. 9, 2010, 248 Pages.

"International Search Report and Written Opinion Issued in PCT Application No. PCT/US2016/025105", dated Jun. 2, 2016, 12 Pages.

Vschwoebel, et al., "Google docs revision history feature", Retrieved From <<https://www.youtube.com/watch?v=vZtydNogZTs>>, Oct. 1, 2012, 2 Pages.

* cited by examiner

MERGED AND ACTIONABLE HISTORY FEED

CROSS-REFERENCE TO RELATED APPLICATIONS

This application claims priority to U.S. Provisional Application Ser. No. 62/141,639, entitled "MERGED AND ACTIONABLE FILE HISTORY FEED," filed on Apr. 1, 2015, the entire disclosure of which is hereby incorporated herein by reference.

BACKGROUND

Computer and software users have grown accustomed to user-friendly software applications for co-authoring content in various forms such as files, documents, messages, and the like, that help them write, calculate, organize, prepare presentations, send and receive electronic mail, make music, collaborate with others, and the like. For example, storage providers (e.g., cloud storage providers) provide applications such as word processing applications, spreadsheet applications, electronic slide presentation applications, e-mail applications, chat applications, voice applications, and the like, where users can co-author and collaborate with one another within the applications. Co-authoring and collaboration within applications may result in an application having a plurality of versions of a single file, for example, associated with the application. However, as the number of versions of a single file increases, the latest version of the file may have changed substantially since a user last viewed the file. As such, it may be difficult for the user to determine what changes were made to the file, which user made the changes, when the changes were made, and whether the changes made in each version of the file are of concern to the user, among other things.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for merging versions and activities associated with a file into a history feed and displaying the history feed on a user interface of a client computing device. In one aspect, a file is identified and activities associated with the file are also identified. It may be determined whether the file has at least one activity. When it is determined that the file has at least one activity, at least one actionable history element for the at least one activity is generated. Additionally, the generated history elements are merged to generate a history feed. The history feed is displayed on a user interface. The history feed may be displayed with an application that has opened the file.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
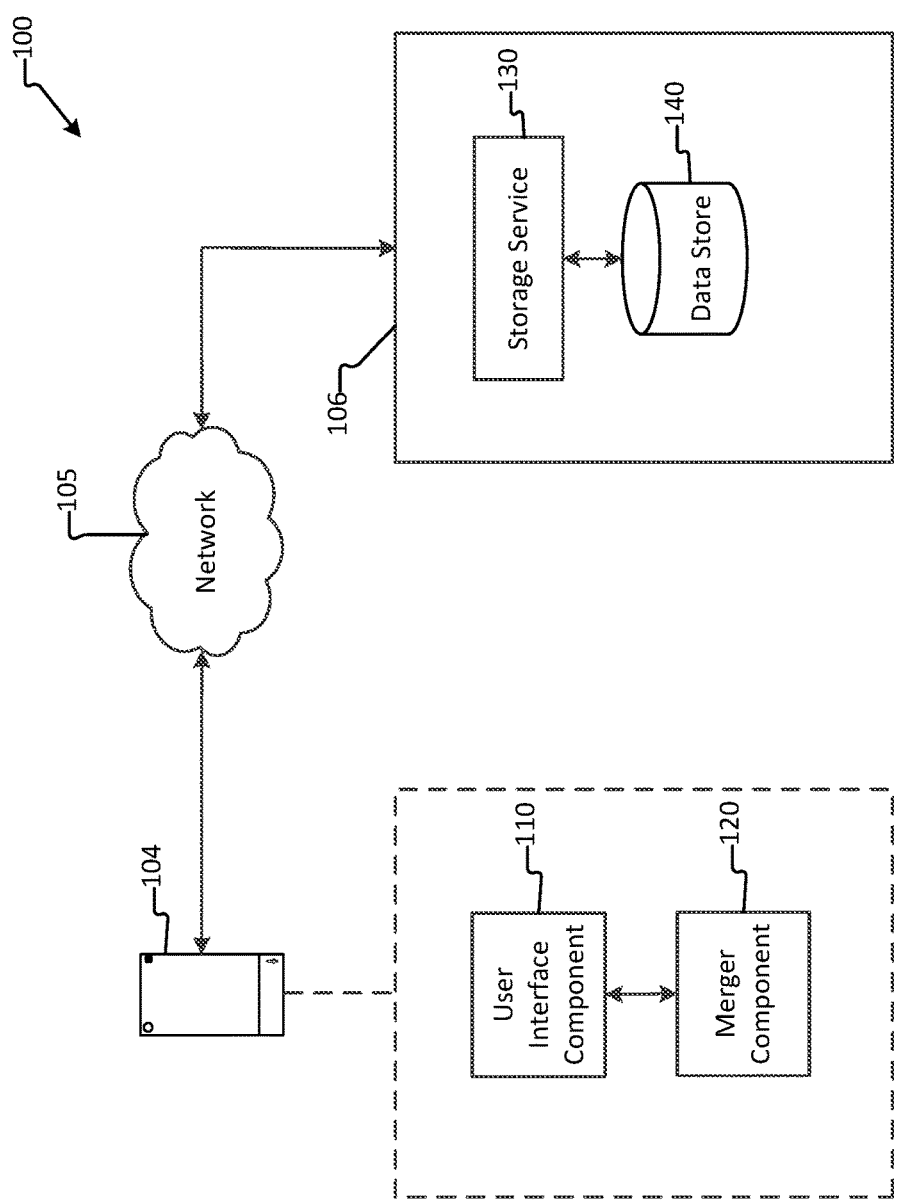
FIG. 1 illustrates an exemplary history feed system for merging versions and activities associated with a file, according to an example aspect.

In some aspects, a history feed is generated for a file. The history feed may be generated by an application associated with the file, such as a content authoring tool for authoring or editing the file. The history feed may include history elements that include various data and information about the history of the file. For example, the history elements may include history elements that correspond to versions of the file. In some aspects, the versions may be generated when a user expressly chooses to create a new version. Additionally or alternatively, a new version may be generated each time the file is changed or each time the file is saved to an online repository.

As another example, the history feed may include history elements that correspond to activities associated with the file. In some aspects, at least some of the activities are associated with particular versions of the file. Examples of the activities include communication activities (e.g., phone conversations, e-mails, instant messages), update activities (e.g., moving or renaming a file), access activities (e.g., viewing, sharing, presenting, or printing a file), review activities (e.g., commenting on or running spellcheck on file), document content exchanges, and permission updates and requests. In aspects, various information about the activities may be stored as well, such as the time of the activity, who performed the activity, and the like. The activities may be stored as part of the file, or may be stored separately. In some aspects, the activities are stored in one or more of the following formats: XML files, records in a relational database, and other formats. In some aspects, the activity stores an identifier of the file it is associated with. Additionally, a file may store references to particular activities it associated with, or locations (e.g., local or remote directories, databases, servers) that may store activities associated with the file. Additionally, a history feed system may store one or more locations in which activities related to certain types of files may be stored. In some aspects, the servers that store activities may include a data provider service and the history feed system may communicate with the data provider service to request and receive activities or versions related to particular files.

In some aspects, the activities are generated by a client computing device and then stored locally or in a repository on one or more server computing devices. Additionally or alternatively, some of the activities are generated and stored by the one or more server computing devices. For example, activities may be generated and stored within one or more of the following: an online storage server such as those used by the ONEDRIVE® online storage service from Microsoft Corporation of Redmond, Wash. or the SHAREPOINT® online collaboration services also from Microsoft Corporation or the GOOGLE DRIVE online storage system from Google Inc. of Mountain View, Calif.; a communication server such as those used by the LYNC® and EXCHANGE® communication services both from Microsoft Corporation or the GMAIL webmail service, GOOGLE CHAT instant messaging service, or GOOGLE APPS service all from Google Inc. of Mountain View, Calif.; and an online content authoring server such as those used by the OFFICE 365 content authoring service also from Microsoft Corporation or the GOOGLE DOCS web-based document word-processing program, GOOGLE SHEETS web-based spreadsheet program, GOOGLE SLIDES web-based presentation program, or GOOGLE FORMS web-based forms program all from Google Inc.

Depending on the activity type and the source of the activity, various techniques for determining when an activity being performed by a user should be associated with a file are used. For example, a user may open a file in an application and then choose to start an instant messaging conversation or send an e-mail from within the application. In some aspects, the application will generate an activity for the instant messaging conversation or e-mail and associate the generated activity with the file that is open or active in the application. Additionally, a user may expressly indicate that an activity is associated with a particular file by, for example, setting a field, activating a user interface control, or responding to a prompt generated by a user interface.

Aspects of the disclosure are directed to a merged and actionable history feed. In one example, versions and activities associated with a file may be merged into a single history feed. Additionally, at least some of the versions and activities merged into the single history feed may be actionable. As discussed above, co-authoring and collaboration within applications may result in an application having a plurality of versions of a single file associated with the application. However, as the number of versions of a single file increases, the latest version of the file may have changed substantially since a user has last viewed the file. As such, it may be difficult for the user to determine what changes were made to the file, which user made the changes, when the changes were made, and whether the changes made in each version of the file are of concern to the user, among other things. Existing systems for file collaboration provide a time-stamped list of versions without associated activities making it difficult for a user to determine activities and/or actions associated with the file over time. Accordingly, aspects described herein include a history feed system for merging versions and activities associated with a file into a single history feed. In aspects, the history feed system provides an actionable history feed. In turn, the history feed system improves user efficiency and user interaction performance when co-authoring and collaborating within applications.

Referring now to the drawings, in which like numerals represent like elements through the several figures, aspects of the present disclosure and the exemplary operating environment will be described.

With reference to FIG. 1, one aspect of a history feed system 100 for merging versions and activities associated with a file into a single history feed is illustrated. In aspects, the history feed system 100 may be implemented on a client computing device 104. In a basic configuration, the client computing device 104 is a handheld computer having both input elements and output elements. The client computing device 104 may be any suitable computing device for implementing the history feed system 100 for merging versions and activities associated with a file into a single history feed. For example, the client computing device 104 may be at least one of: a mobile telephone; a smart phone; a tablet; a phablet; a smart watch; a wearable computer; a personal computer; a desktop computer; a laptop computer; a gaming device/computer (e.g., the XBOX® gaming system from Microsoft Corporation of Redmond, Wash.); a television; etc. This list is exemplary only and should not be considered as limiting. Any suitable client computing device 104 for implementing the history feed system 100 for merging versions and activities associated with a file into a single history feed may be utilized.

In aspects, the history feed system 100 may be implemented on a server computing device 106. The server computing device 106 may provide data to and from the client computing device 104 through a network 105. In aspects, the history feed system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, and wireless and wired transmission mediums. In this regard, versions and activities associated with a file may be merged into a single history feed by the history feed system 100.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera)

functionality for capturing and interpreting user gestures for controlling the functionality of the computing device, and the like.

As illustrated in FIG. 1, the history feed system 100 may include a user interface component 110, a merger component 120, a storage service 130, and a data store 140. The various components may be implemented using hardware, software, or a combination of hardware and software. The history feed system 100 may be configured to merge versions and activities associated with a file into a single history feed and provide an actionable history feed. In this regard, the user interface component 110 may be configured to display a single history feed includes the versions and activities associated with the file. In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

As discussed above, the history feed system 100 may be configured to merge versions and activities associated with a file into a single history feed. In some aspects, the history feed is generated or displayed within a user interface of an application that is associated with the file (e.g., a word processing application if the file is a document). In one example, an application may include any application suitable for collaboration and/or co-authoring such as word processing applications, spreadsheet applications, electronic slide presentation applications, e-mail applications, chat applications, voice applications, and the like. In one case, a file associated with the application may include a word document, a spreadsheet, an electronic slide presentation, an e-mail, a chat conversation, and the like. As such, an exemplary application may be an electronic slide presentation application. In this example, an exemplary file associated with the electronic slide presentation application may include an electronic slide presentation. As such, an exemplary history feed (e.g., the history feed associated with the electronic slide presentation) may include one or more versions of the electronic slide presentation and one or more activities associated with the one or more versions of the electronic slide presentation.

In one case, a version of a file may be created when a user opens, creates, and saves the file. In another case, a version of a file may be created when a certain time period (e.g., at least ten minutes) has passed since the latest version of the file was created and when the file has been edited by a user. For example, a first version of a file may be created by a first user opening, creating, and saving the file. The first user may edit the first version of the file an hour, for example, after the first version of the file is created by the first user. In this case, the history feed system 100 may create a second version of the file. In this example, both the first version of the file and the second version of the file may be part of the history feed of the electronic slide presentation. In another case, a version of a file may be created when a new co-author edits the file. For example, a first version of a file may be created by a first user/author opening, creating, and saving the file. A second user/author of the file may edit the first version of the file created by the first user/author. In this case, the history feed system 100 may create a second version of the file. In this example, both the first version of the file and the second version of the file may be part of the history feed of the electronic slide presentation. In yet another case, a version of a file may be created when the file is shared and/or renamed. For example, a first version of a file may be shared by a first user with a second user of the file. The history feed system 100 may create a second version of the file. In this example, both the first version of the file and the second version of the file may be part of the history feed of the electronic slide presentation. In yet another case, a version of a file may be created when a version of the file is restored to a previous version of the file. For example, a user may restore a second version of a file to the first version of the file. In this case, a new version (e.g., a third version) of the file is created that is identical to the first version of the file.

In aspects, the one or more activities associated with the one or more versions of the file may include both client side activities and server side activities. For example, the one or more activities may include activities associated with the client computing device 104 and activities associated with the server computing device 106. In one example, the one or more activities associated with the one or more versions of the file may include communication activities, document content exchanges, permission requests, and/or printing activities, as well as information about the activities such as a time associated with the activities (e.g., the time the file is printed, the time the file was shared, the time the file was edited), and the like. In aspects, the server computing device 106 is unaware of the one or more activities associated with the client computing device 104 and the client computing device 104 is unaware of the one or more activities associated with the server computing device 106. In one example, the one or more activities associated with the client computing device 104 may include communications such as Instant Messaging and/or voice communications, comments, e-mail activities, presentation of the file, a time at which the file is printed, a time at which the file is co-authored, and the like. In one case, e-mail activities may include a time at which a file was e-mailed, the content of the file at the time at which the file was e-mailed, the sender and recipient of the e-mail, and the like. In one example, the one or more activities associated with the server computing device 106 may include the recipient of a shared file, information associated with a renamed file, an edited file, information associated with a restored file (e.g., information regarding that the file was restored from a second version to a first version), and the like.

As discussed above, the history feed system 100 may include a merger component 120. The merger component 120 may be configured to determine whether a file associated with an application has at least one or more versions and/or one or more activities associated with the one or more versions of the file. In one example, the merger component 120 may receive a notification from the client computing device 104 and/or the server computing device 106. The notification may indicate that the file associated with the application has at least one or more versions and/or one or more activities associated with the one or more versions of the file. In another example, the merger component 120 may request information from the storage service 130. The information requested from the storage service 130 may indicate whether the file associated with the application has at least one or more versions and/or one or more activities associated with the one or more versions of the file. When it is determined that the file associated with the application has at least one or more versions and/or one or more activities associated with the one or more versions, the merger component 120 may merge the one or more versions and/or the one or more activities of the file into a single history feed. In other examples, when a single history feed has been created for a file, any new version and/or new activity may be merged with the already existing history feed, which will be explained in detail below relative to FIG. 2. When the merger component 120 merges the one or more versions and/or the one or more activities in the single history feed, the single history feed may be displayed on the client computing device 104 via the user interface component 110. In some aspects, the merger component 120 merges the one or more versions and the one or more activities by generating history elements associated with at least some of the one or more versions and at least some of the one or more activities. These generated history elements can then be displayed in a list or otherwise using the user interface component 110. For example, the history elements may be displayed as part of a user interface generated by an application associated with the file.

In the example shown in FIG. 1, the merger component 120 is located at the client computing device 104. In other aspects, the merger component 120 is instead located at the server computing device 106. In yet other aspects, the merger component 120 the performs at least a portion of the functions described herein is located at the client computing device 104 and another merger component that also performs at least a portion of the functions described herein is located at the server computing device 106. In this regard, the merger component 120 may be configured to communicate with both the client computing device 104 and the server computing device 106 over the network 105. In this regard, the merger component 120 may be configured to merge the one or more activities associated with the client computing device 104 with the one or more activities associated with the server computing device 106. In other examples, the merger component 120 may merge one or more versions with both the one or more activities associated with the client computing device 104 with the one or more activities associated with the server computing device 106. As such, the merger component 120 may facilitate populating the user interface component 110 with a single history feed including the one or more versions and the one or more activities (e.g., both client side activities and server side activities) associated with the file, which will be described in detail below relative to FIG. 2.

In aspects, the merger component 120 may communicate with the storage service 130. For example, when the merger component 120 is located at the client computing device 104, the merger component 120 communicates with the storage service 130 via the network 105. In one example, the storage service 130 may be configured to store, manage, and access data and/or information associated with the history feed system 100. For example, the storage service 130 may store one or more versions and/or one or more activities associated with a file in a data store 140. In another example, the data store 140 may include attribution information. In one case, attribution information may include information regarding the user/author performing the one or more activities and/or a recipient of the one or more activities. In one example, data store 140 may be part of and/or located at the storage service 130. In another example, data store 140 may be a separate component and/or may be located separate from the storage service 130. It is appreciated that although one server computing device 106 is illustrated in FIG. 1, the history feed system 100 may include a plurality of server computing devices 106 with a plurality of storage services 130 and a plurality of data stores 140. In some cases, the server computing device 106 may include a plurality of storage services 130 and a plurality of data stores 140. In one example, the storage service 130 may be a cloud storage service such as OneDrive, SharePoint, Google Drive, Dropbox, and the like.

In aspects, the merger component 120 may communicate with a plurality of storage services 130. In this regard, the merger component 120 may retrieve one or more versions and one or more activities associated with one or more files that are stored in a plurality of storage services 130. For example, a user of the client computing device 104 may create a first file on a first storage service 130. The first file may have a plurality of versions and one or more activities associated with the plurality of versions. The merger component 120 may be configured to merge the plurality of versions and the one or more activities associated with the plurality of versions into a first history feed for display on the client computing device 104. In another example, the user of the client computing device 104 may create a second file on a second storage service 130. The second file may have a plurality of versions and one or more activities associated with the plurality of versions. The merger component 120 may be configured to merge the plurality of versions and the one or more activities associated with the plurality of versions into a second history feed for display on the client computing device 104. In this regard, the merger component 120 may merge (e.g., into a history feed) versions and activities associated with files located on any number of and/or any type of storage services 130.

Figure 2:
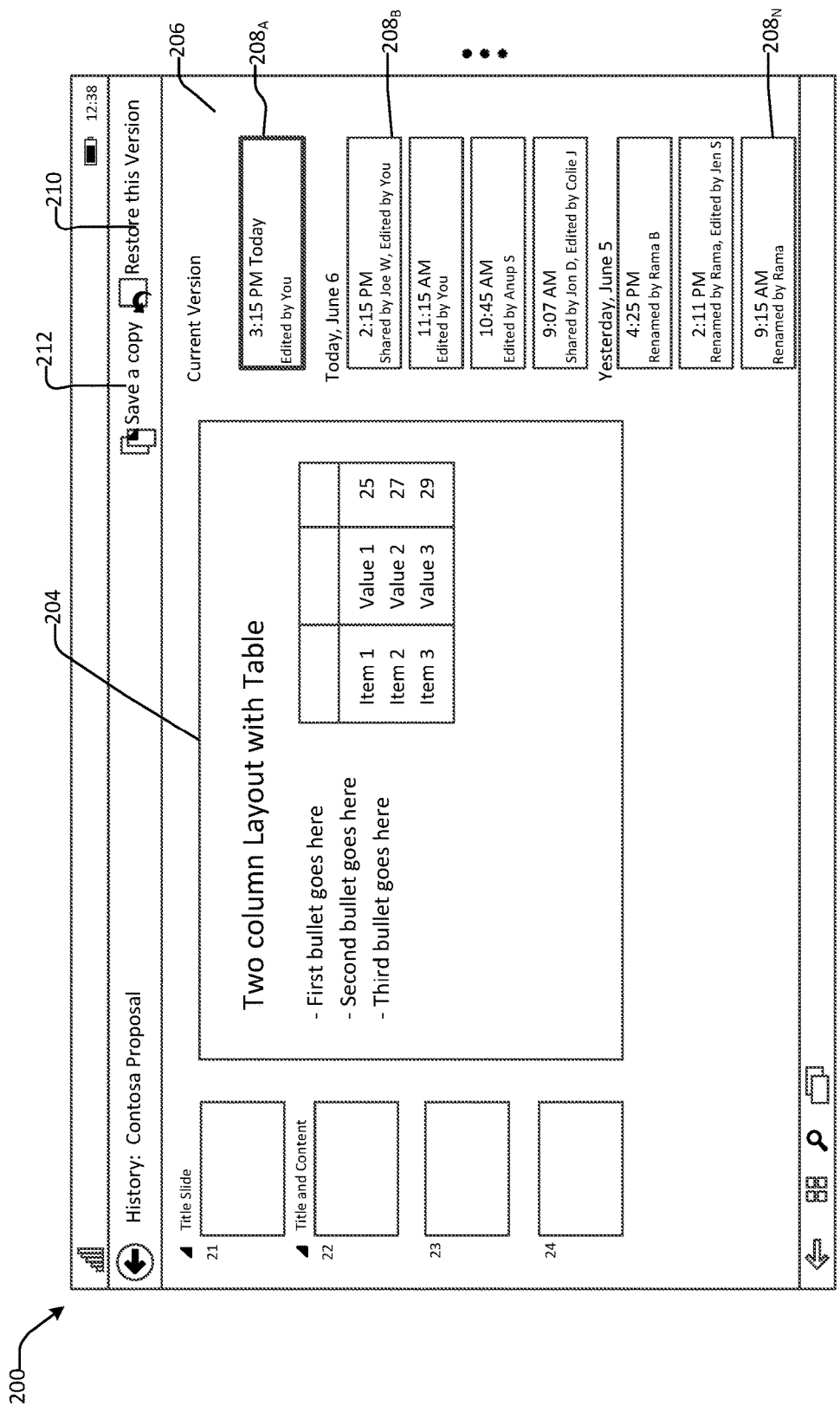
FIG. 2 illustrates an exemplary user interface for displaying a history feed, according to an example aspect.

Referring now to FIG. 2, an example user interface 200 of the client computing device 104, such as a desktop computer, tablet computer or a mobile phone, for example, is shown. As illustrated, the user interface 200 displayed on the client computing device 104 includes a file 204, a history feed 206, a plurality of history elements 208A-208N, a restore button 210, and a save button 212. The history elements 208A-208N are exemplary history elements of the history feed 206. It is appreciated that while FIG. 2 illustrates history elements 208A-208N of the history feed 206, the discussion of history elements 208A-208N and the history feed 206 is exemplary only and should not be considered as limiting. Any suitable number and/or type (e.g., versions and/or activities) of history elements 208A-208N of the history feed 206 may be merged and displayed on the client computing device 104. Furthermore, while the present disclosure discusses the user interface 200, the file 204, and the history feed 206, this is only exemplary and should not be considered limiting. Any number of user interfaces, files, and/or history feeds may be utilized in conjunction with the present disclosure. In one example, the restore button 210 may be selected to restore the version from a later version to an earlier version, for example. In another example, the save button 212 may be selected to save a copy of the version.

As illustrated in FIG. 2, the history elements 208A-208N of the history feed 206 include one or more versions and one or more activities associated with the file 204. In the example illustrated in FIG. 2, the file 204 is an electronic slide presentation. As discussed above, the file 204 may be any file of any application suitable for co-authoring and collaboration between one or more users/authors. As discussed above, the merger component 120 may be configured to determine whether a file associated with an application has at least one or more versions and/or one or more activities associated with the one or more versions of the file. When it is determined that the file associated with the application has at least one or more versions and/or one or more activities associated with the one or more versions, the merger component 120 may merge the one or more versions and/or the one or more activities of the file into the single history feed 206. In other examples, any new version and/or new activity may be merged with the already existing history feed 206. For example, the merger component 120 may determine that a new activity associated with the current version has been performed. As such, the merger component 120 may merge the new activity with the already existing history feed 206. In one aspect, the new activity may be merged at the top of the history feed 206 (e.g., when the history feed 206 is ordered by time). In another aspect, the new activity may be merged into the history feed 206 based on how the history feed 206 is filtered or ordered.

In one example, the history feed 206 is ordered and/or filtered by time. For example, as illustrated in FIG. 2, history element 208A shows the latest activity (e.g., an edit by the current user) of the current version of the file 204. History element 208B shows a previous activity (e.g., a share of the file by a user) of the current version of the file 204. In this example, all of the shown history elements 208A-208N include an associated time (e.g., the time at which the corresponding activity occurred). In some cases, the history elements are ordered by time in chronological order. In other cases, the history elements are ordered by time in reverse chronological order. In another example, the history feed 206 is ordered and/or filtered based on the activity (e.g., based on activity type, associated user). In yet another example, the history feed 206 is ordered and/or filtered based on the authors and/or co-authors of the file 204. One of ordinary skill in the art will appreciate that the history feed 206 may be ordered and/or filtered based on a variety of other factors, including priority, importance, frequency, and/or other characteristics. In some examples, the history elements 208A-208N may be identified on the user interface 200 by at least one of glyphs, profile images, and text. For example, glyphs may be used to indicate a type of history element (e.g., glyphs may be used to indicate an activity type associated with the history element).

Figure 3:
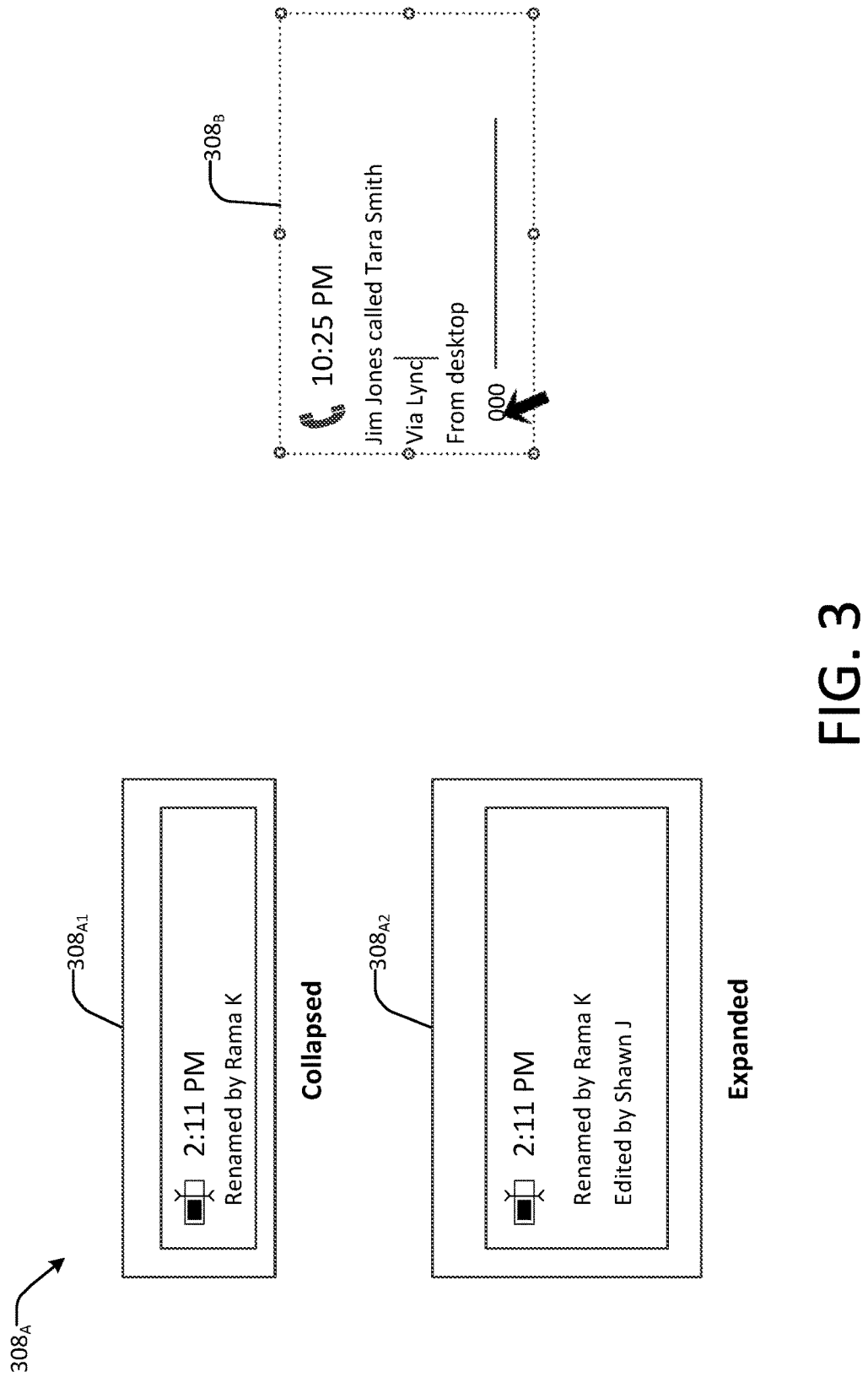
FIG. 3 illustrates exemplary history elements of a history feed, according to an example aspect.

In some aspects, the history elements 208A-208N are selectable. FIG. 3 illustrates an exemplary history element 308A, and an exemplary history element 308B. History element 308A shows an activity in a collapsed state 308A1 and an expanded state 308A2. As such, when a user selects the history element 308A (e.g., an activity), the history element 308A may toggle between the collapsed state 308A1 and the expanded state 308A2 that shows additional information relating to the activity. In one example, the history elements 208A-208N are collapsed by default and are expanded when selected. When history element 308A is collapsed, the information displayed includes that the file was renamed. When history element 308A is expanded, the information displayed includes that the file was renamed and that the filed was edited.

In some aspects, the history elements 208A-208N are actionable. For example, when a user selects a history element, the user may interact with the history element and take further action. History element 308B shows a conversation between two users. History element 308B, as illustrated, has been selected and expanded. As such, history element 308B shows the time of the conversation, the people involved in the conversation, the application used for the conversation, and a button to play the conversation in-line. As such, history element 308B is actionable. For example, a user may click on the button to playback the conversation in-line (e.g., without having to access a separate program to playback the conversation). In other examples, actionable history elements may include actions such as copying content from a version, saving a copy of the version, commenting in-line (e.g., instead of having to go to the comments pane to comment), viewing an archived chat conversation, watching an archived video chat conversation, replying to an existing comment in-line, resolving a comment in-line, changing user/author and/or file permissions in-line, and the like.

Figure 4:
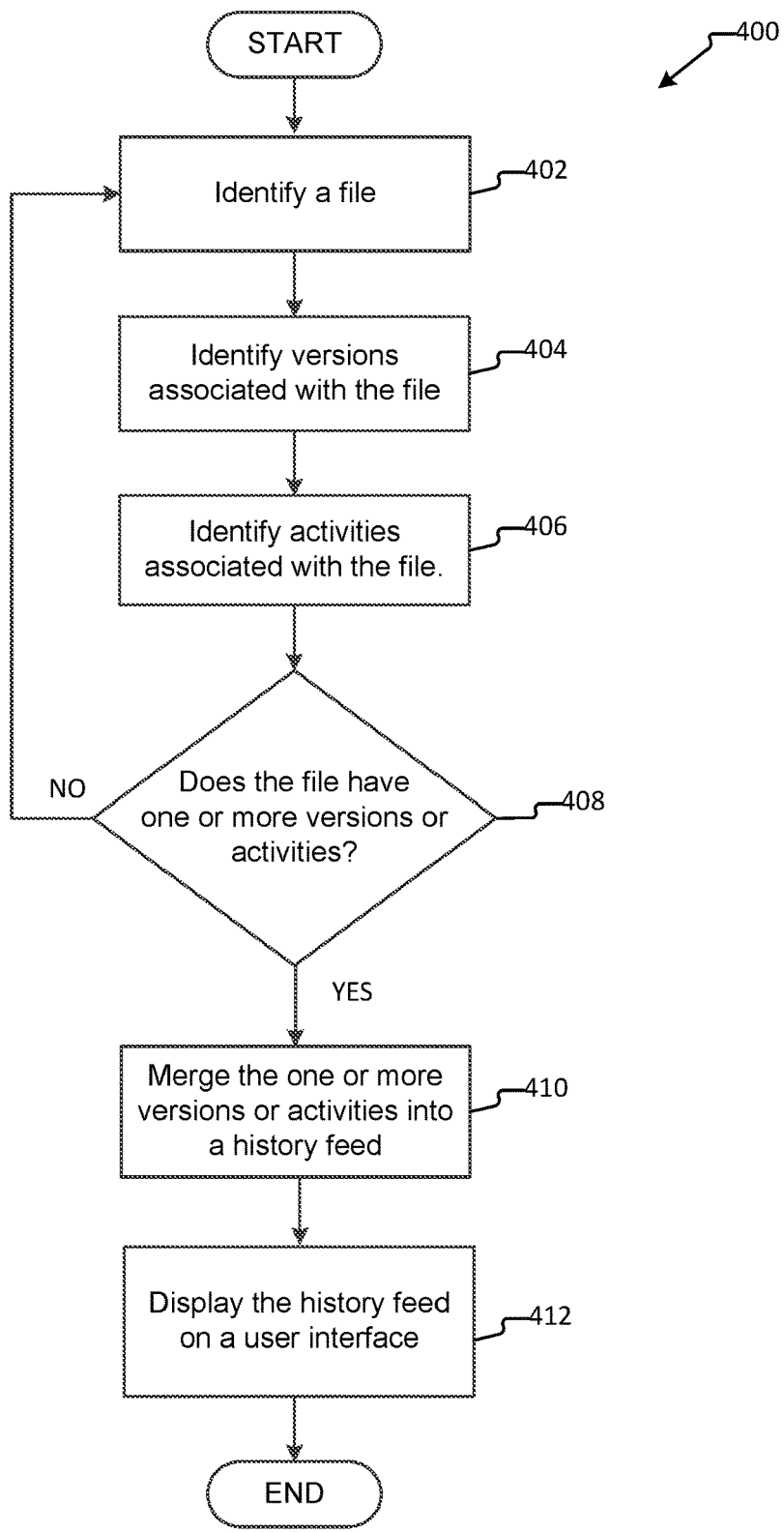
FIG. 4 illustrates an exemplary method for displaying a history feed on a user interface of a client computing device, according to an example aspect.

Referring now to FIG. 4, an exemplary method 400 for displaying a history feed for a file on a user interface of a client computing device, according to an example aspect is shown. Method 400 may be implemented on a computing device or a similar electronic device capable of executing instructions through at least one processor. The history feed may be displayed by any suitable software application. For example, the software application may be one of an e-mail application, a social networking application, a project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for displaying the history feed may be utilized by method 400. In some aspects, the method 400 is performed by the merger component 120.

Method 400 may begin at operation 402, where a file is identified. In some aspects, the file is identified by an application when the user opens a file. Alternatively, in some aspects, the file is identified by the application when the user selects or activates a file (e.g., when the application has multiple files open simultaneously). In yet other aspects, a file may be identified based on the user selecting the file using a user interface control such as a file chooser or a drop down list.

At operation 404, versions associated with the file are identified. In some aspects, one or more versions are identified for the file. In some aspects, versions of the file are identified by querying a database or data service provider on remote computing devices such as the server computing device 106. In some aspects, version of the file are also identified locally on the client computing device 104 (e.g., based on querying a database, searching a file system, analyzing metadata associated with the file).

At operation 406, activities associated with the file are identified. In some aspects, one or more activities are identified. In some aspects, identifying activities associated with the file comprises identifying activities associated with the identified versions of the files. However, in some aspects, at least some activities are associated directly with the file rather than being associated with a version of the file. In some aspects, identifying the activities may comprise identifying both client-side activities and server-side activities. For example, the one or more activities may include activities associated with the client computing device 104 and activities associated with the server computing device 106. In some aspects, the merger component 120 determines one or more potential locations of activities related to the file by, for example, analyzing metadata associated with the file and retrieving a list of potential locations that may be applicable to all files or at least all files of a particular type. In some aspects, the merger component 120 queries data provider services associated with the potential locations to retrieve activities stored in the locations. Additionally, activities that are stored locally on the client computing device 106 are identified as well (e.g., by analyzing metadata associated with the filed, querying a database, searching through a file system or portion thereof).

At decision operation 408, it is determined whether the file has one or more version or activities. If it is determined that the file has one or more versions or activities, flow proceeds to operation 410 where the one or more versions of the file and/or the one or more activities associated with the file are merged into a history feed. For example, the history feed may include history elements that include both the one or more versions and/or the one or more activities. In this regard, a user of the history feed system may easily identify versions and activities associated with the file. In turn, the user's efficiency and interaction performance is improved when co-authoring and collaborating within applications. In some aspects, at least some of the activities are associated with versions of the file in the history feed to convey that the activity related to a particular version of the file.

If it is determined that the file does not have at least one or more versions or activities, in some aspects, flow proceeds back to operation 402 where another file is identified. Alternatively, in some aspects, when flow proceeds back to operation 402, it is again determined whether the same file has one or more versions or activities. In this manner, a file can be monitored for new versions and activities. Further, before proceeding back to operation 402, some aspects, display a history feed that is empty. Additionally, in some aspects, the method 400 terminates if it is determined that the file does not have one or more versions or activities.

Although the exemplary method 400 determines whether the file has one or more activities or versions, other aspects determine whether the file has at least a predetermined number of versions and/or a predetermined number of activities. For example, the predetermined number of versions may be one version, two versions, or another number of versions and the predetermined number of activities may be one activity, two activities, or another number of activities.

When the one or more activities or versions are merged into the history feed, flow proceeds to operation 412 where the history feed is displayed on the user interface of the client computing device. For example, the history feed may be displayed within the user interface of an application that has opened the file. The history feed may be displayed as a list of history elements including the one or more versions and/or activities. In some aspects, the history elements may be selectable. For example, when a user selects a history element, the history element may expand to show additional information relating to the activity. In one example, an expanded history element may be collapsed when the user select the history element again. Alternatively or additionally, the history may be collapsed when the user selects a different history element. Further, the history elements may be actionable. For example, when a user selects a history element, the user may interact with the history element and take further action.

Figure 5:
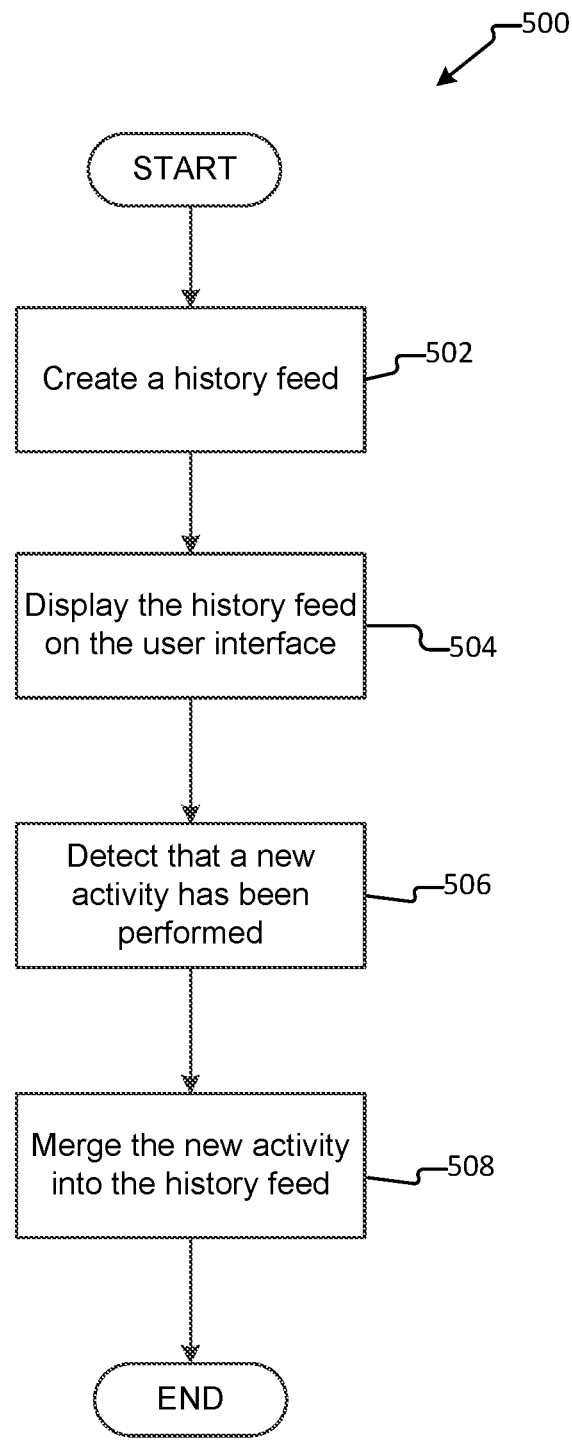
FIG. 5 illustrates an exemplary method for updating a history feed on a user interface of a client computing device, according to an example aspect.

Referring now to FIG. 5, an exemplary method 500 for updating a history feed on a user interface of a client computing device, according to an example aspect is shown. Method 500 begins at operation 502 where a history feed is created. For example, it may be determined whether a file has one or more versions and/or activities. When it is determined that a file has one or more versions and/or activities, the history feed may be created using the one or more versions and/or activities. The history feed may include a list of one or more history elements associated with the versions and activities. In some aspects, at least some of the history elements are actionable.

When the history feed is created, flow proceeds to operation 504 where the history feed is displayed on the user interface of the client computing device. For example, the history feed may be displayed within an application that is displaying the file on the user interface. The history feed may be displayed as a list of history elements that are associated with the one or more versions and/or activities. In some aspects, the history elements may be selectable. For example, when a user selects a history element, the history element may expand to show additional information relating to the activity. In one example, an expanded history element may also be collapsed when it selected again. Alternatively or additionally, the history elements may be actionable. For example, when a user selects a history element, the user may be able to interact with the history element and take further actions.

At operation 506, a new activity that has been generated and is associated with the file is detected. In some aspects, the new activity may be either a client-side activity or a server-side activity. Additionally, the new activity may be, for example, a communication activity, document content exchange, permission request, or printing activity. In some aspects, the new activity also includes information such as a time associated with the activities (e.g., the time the file is printed, the time the file was shared, the time the file was edited), and the like. In this regard, in one example, a new activity may be detected when a file is printed. As such, a printing activity that includes information associated with the activity (e.g., the time at which the file was printed) may be detected and merged into the history feed.

When a new activity associated with the file is detected, flow proceeds to operation 508, where the new activity associated with the file is merged into the history feed. A history element may be generated for the new activity and then the history element may be merged into an already existing history feed. In one aspect, the history element associated with the new activity may be merged at the top of the history feed (e.g., when the history feed is ordered by time). In another aspect, the history element associated with the new activity may be merged into the history feed based on a filter or sort property associated with the history feed. In one example, the new activity associated with the file is displayed within the history feed on the user interface of the client computing device.

Additionally, in some aspects, it is determined whether the activity is associated with an action. For example, a communication activity may be associated with a review or playback option (e.g., to review an e-mail or a transcript of a conversation, or playback a recording). Upon determining that the activity is associated with an action, an actionable history element may be generated and merged into the history feed. For example, the history element may include a user-actuatable control to cause a recording to playback.

Although the method 500 has been described in terms of detecting a new activity, in some aspects, the method 500 also operates to detect a new version. In these aspects, a history element associated with the new version may be generated and merged into the history feed.

Techniques for providing a merged and actionable history feed are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Figure 6:
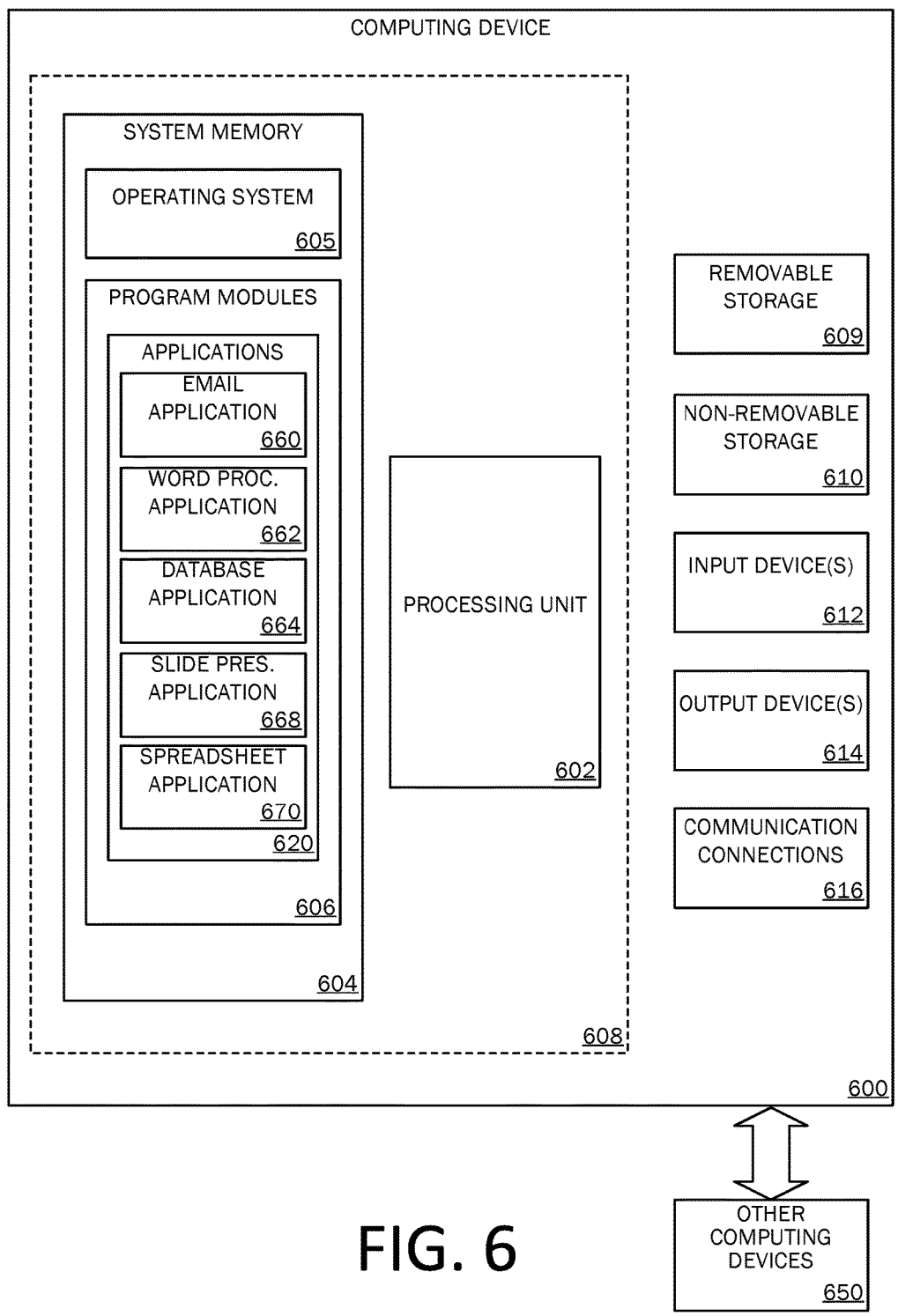
FIG. 6 is a block diagram illustrating example physical components of a computing device with which aspects of the disclosure may be practiced.
Figure 7A:
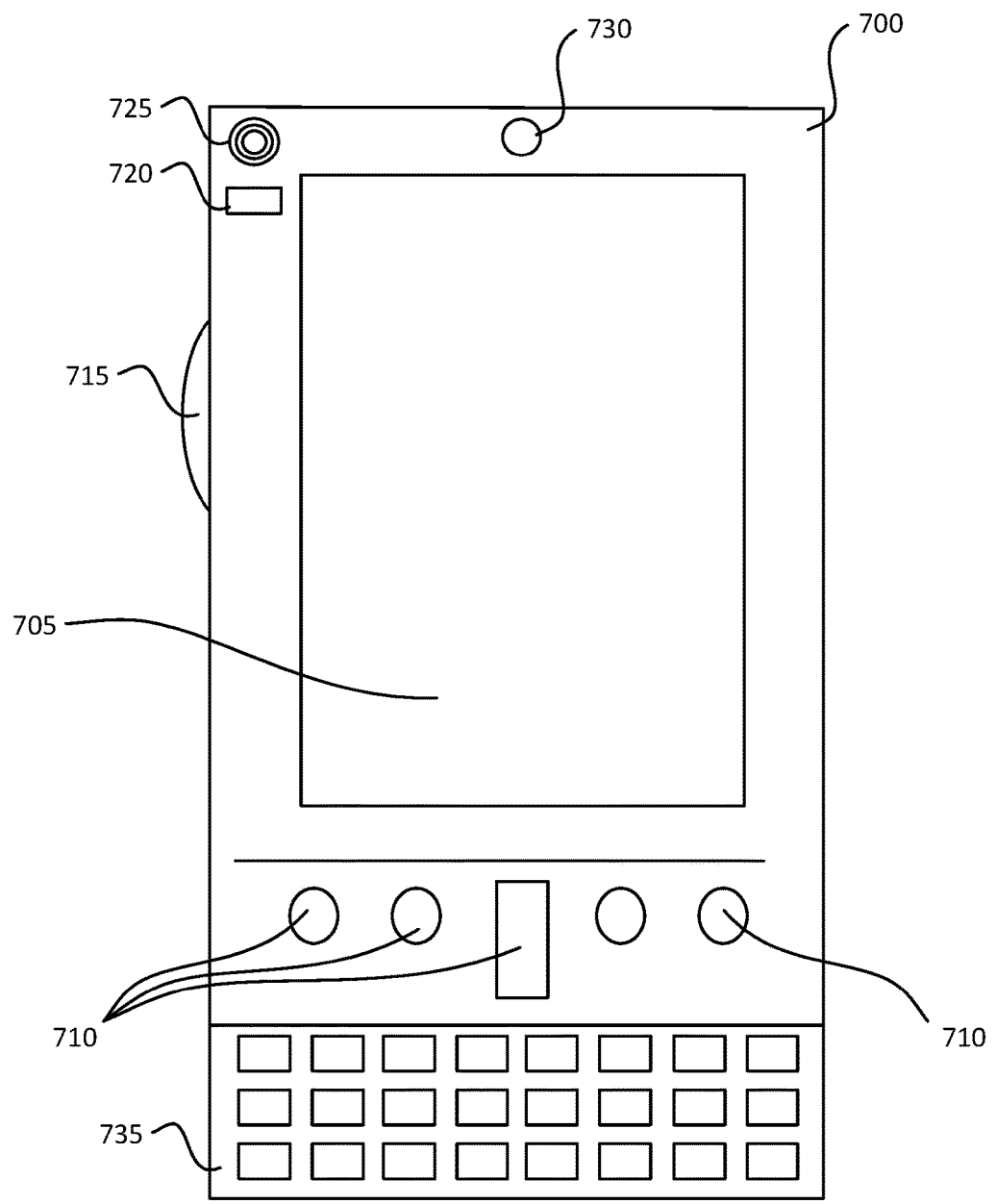
FIGS. 7A and 7B are simplified block diagrams of a mobile computing device with which aspects of the present disclosure may be practiced.
Figure 7B:
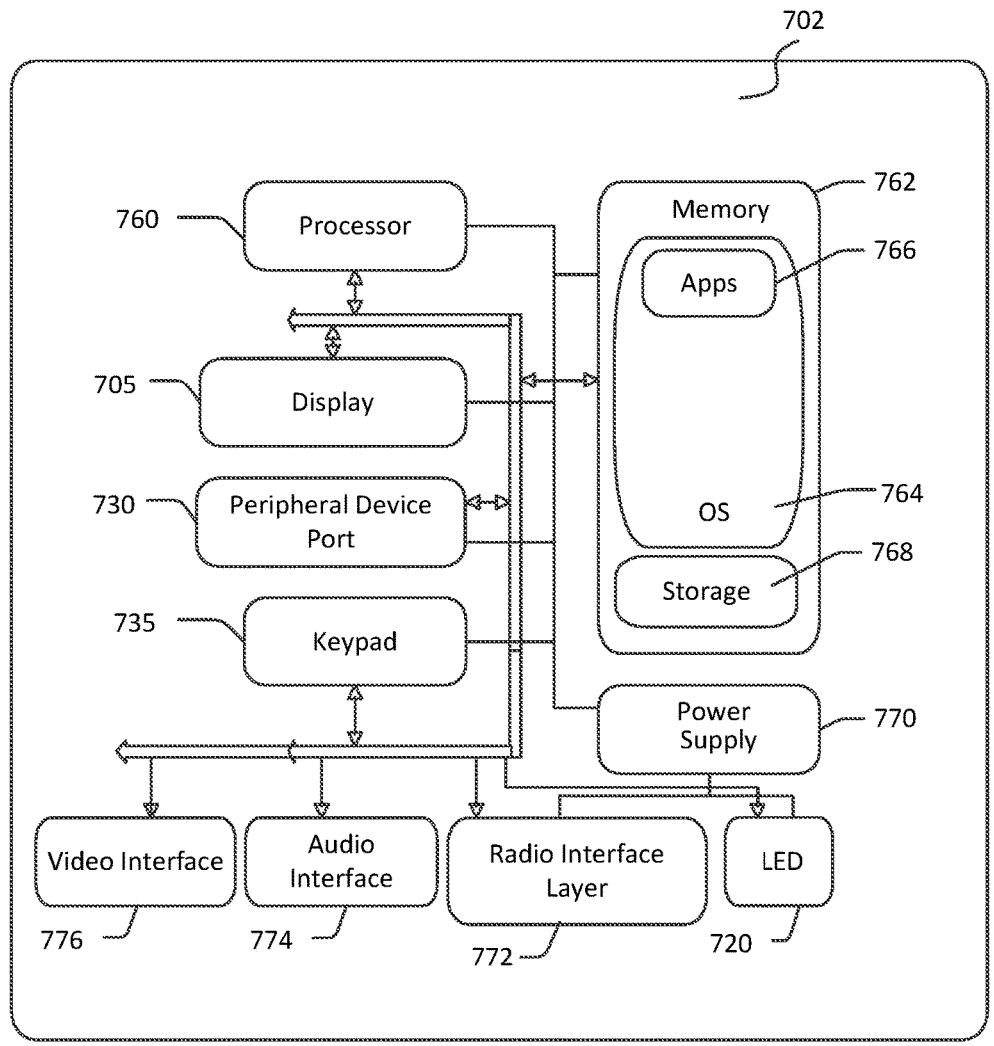
Figure 8:
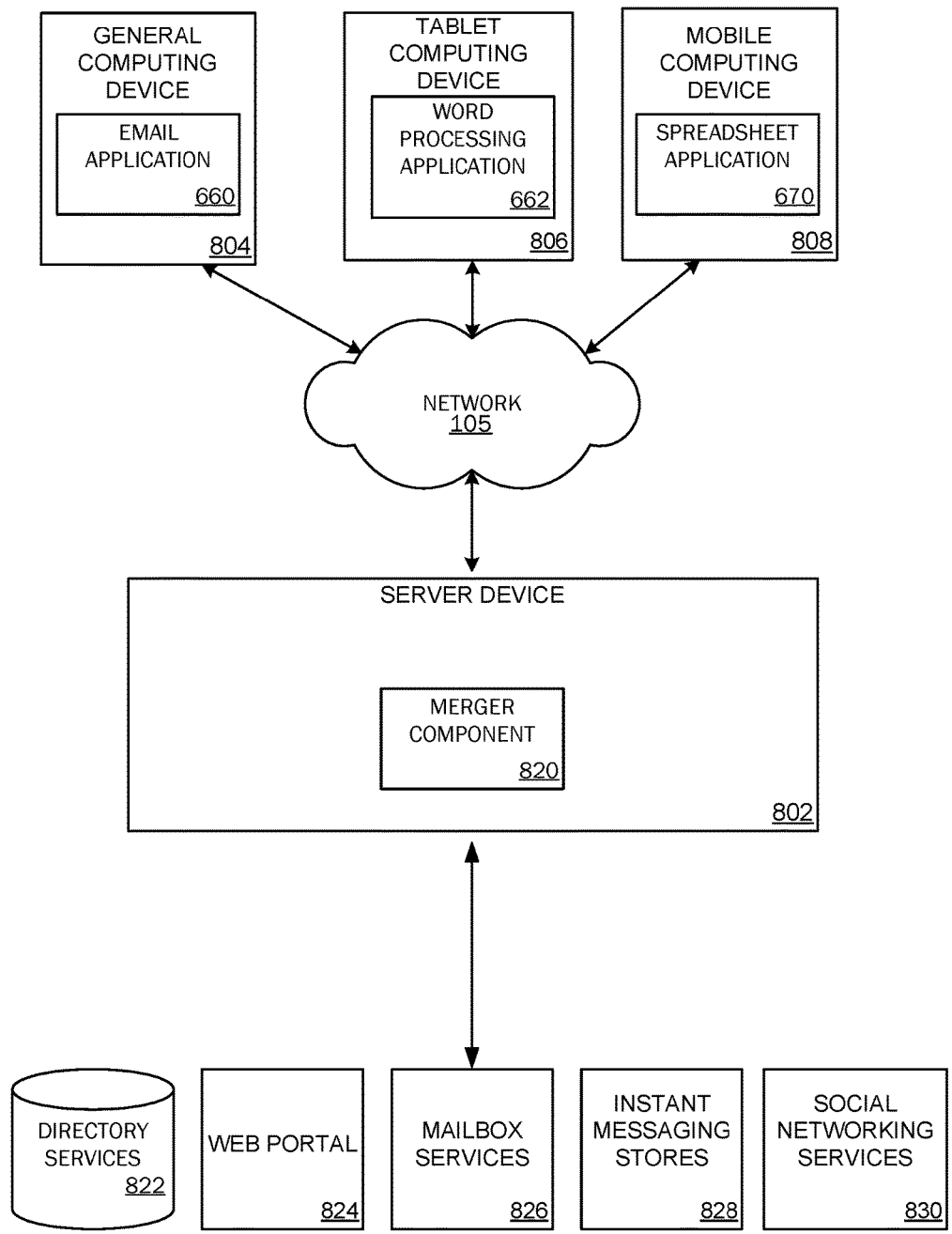
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure described herein.

FIG. 6 is a block diagram illustrating physical components (e.g., hardware) of a computing device 600 with which aspects of the disclosure may be practiced. The computing device components described below may be computer executable instructions for an e-mail application 660, word processing application 662, database application 664, slide presentation application 668, spreadsheet application 670, and any other suitable application that can be executed to employ the methods 400 and 500 disclosed herein. The computing device components described below may be further configured to executed and perform computer executable instructions for the merger component 120, for example. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 utilizing the history feed system as illustrated in FIGS. 1-3. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, the aspects, as described herein. Other program modules that may be used in accordance with aspects of the present disclosure, and in particular to generate screen content, may include electronic mail and contacts applications, contact applications, drawing applications, messaging applications, calendaring applications, a social networking application, project management application, a collaboration application, an enterprise management application, and/or other applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of merging versions and activities associated with a file into a history feed and displaying the history feed on a user interface may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, wearable computer (such as a smart watch), a tablet personal computer, a laptop computer, a desktop computer, and the like, with which aspects of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen display in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one aspect, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions to merge and display a history feed as described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated aspect, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776, which may enables operation of an on-board camera to record still images, video stream, and the like or an external camera connected to a peripheral device port 730. Other types of devices may also be connected to the peripheral device port 730.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device (e.g., a server computer in a distributed computing network, such as the Internet) associated with the mobile computing device 700. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for displaying a history feed on a client computing device for a file comprising activities and/or versions received from a remote source such as the server device 802. Examples of the client computing device include the general computing device 804, tablet 806, or mobile device 808, as described above. In this aspect, the general computing device 804 is executing an e-mail application 660 that is part of the history feed system described herein. Further, in this aspect, the tablet 806 is executing a word processing application 662 that is part of the history feed system described herein. Additionally, in this aspect, the mobile computing device 808 is executing a spreadsheet application that is part of the history feed system described herein. The server device may include a merger component 820, which may be similar to the previously described merger component 120. The merger component 820 may merge activities and versions that are stored in different communication channels or other storage types. Systems and methods for merging versions and activities associated with a file into a history feed and displaying the history feed on a user interface of a client computing device are described in detail above and illustrated in at least FIGS. 1-5. For example, various files, activities, and versions may be stored using a directory service 822, a web portal 824, a mailbox service 826, an instant messaging store 828, or a social networking site 830.

Figure 9:
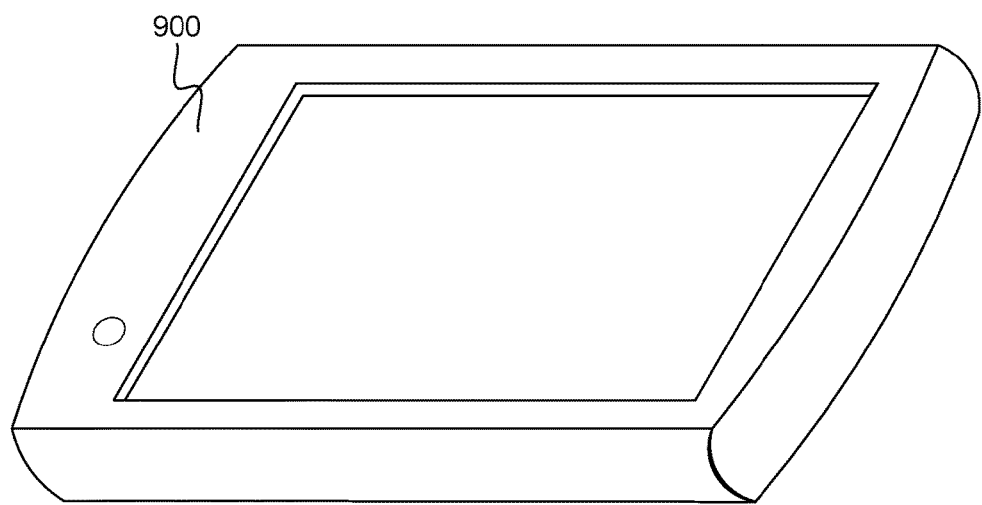
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Among other examples, the present disclosure presents a system for displaying a history feed, the system comprising: at least one processor; and memory encoding computer executable instructions that, when executed by the at least one processor, perform a method for displaying a history feed on a user interface, the method comprising: identifying a file; identifying activities associated with the file; determining whether the file has at least one activity; and when it is determined that the file has at least one activity: generating at least one actionable history element for the at least one activity; merging the generated history elements to generate a history feed; and displaying the history feed on the user interface. In further examples, identifying versions associated with the file; when it is determined that the file has at least one version: generating at least one history element for the at least one version; and merging the generated history elements into the history feed. In further examples, the at least one activity associated with the file includes both activities associated with the client computing device and activities associated with a server computing device. In further examples, the activities associated with the client computing device include at least one of Instant Messaging, voice communication, comments, e-mail activities, a presentation of the file, a co-authoring activity, and a printing activity. In further examples, the activities associated with the server computing device include at least one of a recipient of a shared file, information associated with a renamed file, an edited file, and information associated with a restored file. In further examples, the system further comprises a data store and identifying activities associated with the file comprises: querying a data service provider associated with a server computing device for activities associated with the file; and retrieving activities associated with the file from the data store. In further examples, detecting that a new version of the file has been created; and merging the new version of the file into the history feed. In further examples, detecting that a new activity associated with the file has been performed; and merging the new activity associated with the file into the history feed. In further examples, the new activity associated with the at least one version is merged into the history feed based on a filter of the history feed. In further examples, the one or more history elements are collapsible and expandable. In further examples, the one or more history elements are collapsed by default, and wherein the one or more history elements expand when selected.

Further aspects disclosed herein provides an exemplary system for displaying a history feed for a file within a user interface of an application, comprising: at least one processor; and memory encoding computer executable instructions that, when executed by the at least one processor, perform a method, the method comprising: identifying a file associated with the application; determining whether the file has at least one activity; when it is determined that the file has at least one activity, merging the at least one activity into the history feed; and displaying the history feed on the user interface of the application, wherein the history feed includes a plurality of history elements, wherein the plurality of history elements comprises at least one history element corresponding to the at least one activity associated with the file, and wherein the plurality of history elements are actionable. In further examples, receiving a selection of at least one history element. In further examples, expanding the selected at least one history element. In further examples, receiving an in-line input to perform an action associated with the selected at least one history element; and performing the action. In further examples, the action associated with the at least one history element includes at least one of playing a conversation, editing the file, restoring the file, saving the file, copying content of the file, and presenting comments associated with the file.

Additional aspects disclosed herein provide exemplary methods for updating a history feed on a user interface of a client computing device, the method comprising: creating a history feed for a file comprising a plurality of actionable history elements, wherein the plurality of history elements includes at least one history element corresponding to at least one activity associated with the file; displaying the history feed on the user interface of the client computing device; detecting that a new activity associated with the file has been performed; and merging the new activity associated with the at least one version into the history feed. In further examples, merging the new activity associated with the file into the history feed comprises displaying the new activity associated with the file within the history feed on the user interface of the client computing device. In further examples, merging the new activity associated with the at least one version into the history feed is based on a filter of the history feed. In further examples, detecting that a new version of the file has been created; and merging the new version of the file into the history feed.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of history feed systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system for displaying a history feed, the system comprising:
    at least one processor; and
    memory encoding computer executable instructions that, when executed by the at least one processor, perform a method for displaying a history feed on a user interface, the method comprising:
        identifying a file and one or more versions associated with the file;
        generating at least one first history element for each of the one or more versions;
        merging the generated at least one first history element to generate the history feed;
        determining whether one or more activities is associated with the file;
        based on a determination that one or more activities is associated with the file:
            generating at least one second history element for each of the one or more activities; and
            merging the generated at least one second history element into the history feed; and
        displaying the history feed on the user interface.

2. The system of claim 1, wherein at least one of the first or the second history elements comprises an actionable history element that is interactive and configured to perform an action.

3. The system of claim 1, wherein the at least one activity associated with the file includes both activities associated with the client computing device and activities associated with a server computing device.

4. The system of claim 3, wherein the activities associated with the server computing device include at least one of a recipient of a shared file, information associated with a renamed file, an edited file, or information associated with a restored file.

5. The system of claim 3, wherein the activities associated with the client computing device include at least one of Instant Messaging, voice communication, comments, e-mail activities, a presentation of the file, a co-authoring activity, or a printing activity.

6. The system of claim 1, wherein the system further comprises a data store and wherein identifying activities associated with the file comprises:
querying a data service provider associated with a server computing device for activities associated with the file; and
retrieving activities associated with the file from the data store.

7. The system of claim 1, further comprising:
detecting that a new version of the file has been created;
generating a new history element for the new version; and
merging the new history element into the history feed.

8. The system of claim 1, further comprising:
detecting that a new activity associated with the file has been performed;
generating a new history element for the new activity; and
merging the new history element into the history feed.

9. The system of claim 8, wherein the new history element is merged into the history feed based on a filter of the history feed.

10. The system of claim 1, wherein at least one of the first or the second history elements are collapsible and expandable.

11. The system of claim 10, wherein the first and the second history elements are collapsed by default, and wherein the first or the second history elements expand when selected.

12. A system for displaying a history feed for a file within a user interface of an application, comprising:
at least one processor; and
memory encoding computer executable instructions that, when executed by the at least one processor, perform a method, the method comprising:
identifying a file and one or more versions of the file associated with the application;
merging a history element corresponding to each of the one or more versions of the file into the history feed;
determining whether the file has at least one activity;
based on a determination that the file has at least one activity, merging a history element corresponding to each of the at least one activity into the history feed; and
displaying the history feed on the user interface of the application.

13. The system of claim 12, wherein:
one or more history elements is interactive; and
the method further comprises receiving a selection of at least one of
the one or more history elements that is interactive.

14. The system of claim 13, further comprising expanding the selected at least one history element.

15. The system of claim 14, further comprising:
receiving a user interaction for the selected at least one history element, wherein the user interaction comprises an in-line input to perform an action associated with the selected at least one history element; and
performing the action.

16. The system of claim 15, wherein the action associated with the at least one history element includes at least one of playing a conversation, editing the file, restoring the file, saving the file, copying content of the file, or presenting comments associated with the file.

17. A method for updating a history feed on a user interface of a client computing device, the method comprising:
creating a history feed for a file comprising a plurality of actionable history elements, wherein the plurality of history elements includes at least one history element corresponding to at least one activity associated with the file and at least one history element corresponding to at least one version of the file;
displaying the history feed on the user interface of the client computing device;
detecting that a new activity associated with the file has been performed;
generating a new history element corresponding to the new activity;
merging the new history element into the history feed; and
causing the history feed to be presented on an output device.

18. The method of claim 17, wherein the output device comprises a display and merging the new history element into the history feed comprises displaying the history element corresponding to the new activity associated with the file within the history feed on the user interface of the client computing device.

19. The method of claim 17, wherein merging the new history element into the history feed is based on a filter of the history feed.

20. The method of claim 17, further comprising:
detecting that a new version of the file has been created; and
merging a history element corresponding to the new version of the file into the history feed.

* * * * *